H. J. Kent,
Potato Planter.
No. 111,217.     Patented Jan. 24, 1871.
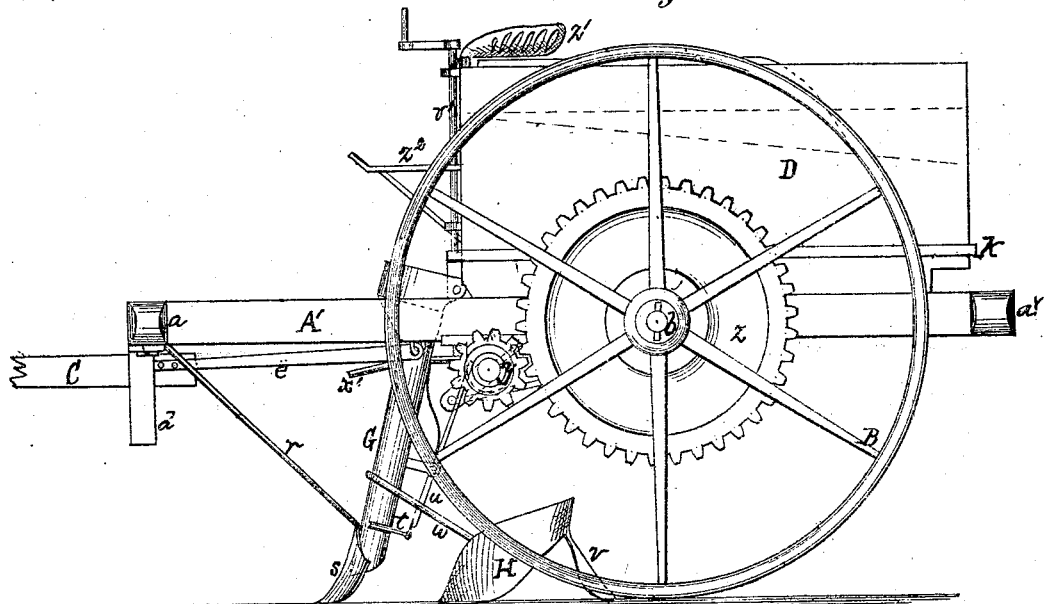
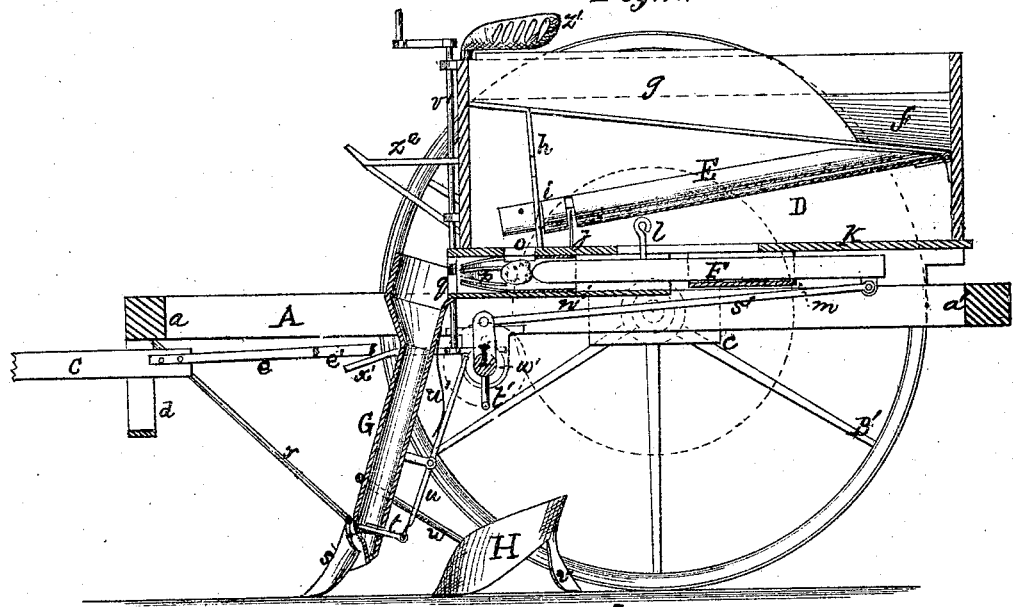
Witnesses:    Inventor:
N. Dubois    Hiram J. Kent,
E. G. Hartman    by Geo. W. Rothwell
    Atty.

United States Patent Office.

HIRAM J. KENT, OF PALMYRA, NEW YORK.

Letters Patent No. 111,217, dated January 24, 1871.

IMPROVEMENT IN POTATO-PLANTERS.

The Schedule referred to in these Letters Patent and making part of the same.

*To all whom it may concern:*

Be it known that I, HIRAM J. KENT, of Palmyra, in the county of Wayne and State of New York, have invented certain new and useful Improvements in Potato-Planters; and I do hereby declare the following to be a full, clear, and exact description thereof, sufficient to enable those skilled in the art to which my invention appertains to fully understand and to make and use the same, reference being had to the accompanying drawing forming part of this specification, and in which—

Figure 1 is a side elevation of a planter constructed according to my invention;

Figure 2 is a longitudinal central section of the same; and

Figure 3 is a detail view of the cutters, to be hereinafter more fully referred to.

The subject of this invention is a machine which, being drawn over a field, cuts the seed-potatoes, and deposits the same either in hills or drills formed by an opener attached to the delivery-tube, after which the earth is drawn over the row by a coverer, the seed-potatoes being carried in a hopper, from which they are taken to a knife, and then to the tube, which delivers them into the trench prepared for their reception, the several devices being automatic in their operation, as will be shown.

The invention consists, especially, in the improved cutting devices and the dropping mechanism.

It also consists in the construction, arrangement, and combination of parts, as hereinafter described and claimed.

Referring to the drawing, in which similar letters of reference indicate like parts in the several figures—

A A' represent the side bars, and $a\ a'$, the front and rear cross-bars, respectively, of a frame-work, preferably made of wood, in rectangular form.

This frame is balanced (for a purpose to be hereinafter stated) upon traction-wheels B B', which turn loosely on studs $b\ b$, projecting from plates $c\ c$, secured to the sides of the frame.

C is the tongue, attached, within a loop, $d$, to draft-bars $e\ e'$, which are connected to the side bars A A' in such a manner as to have slight vertical play.

Mounted upon the balanced frame, between the draft-wheels, is a casing, D, of wood or metal, in the upper part of which is formed the hopper wherein the seed-potatoes are placed.

The bottom of this hopper is composed of two plates, $f\ f$, having a downward inclination toward the center and rear.

Between the inner edges of these plates, which are provided with vertical sides $g\ g$, is a space extending the entire length of the hopper, in which is placed a trough, E, hinged at its rear end to the casing D, and preferably made V-shaped in its cross-section, but with a flat bottom.

At its front end the trough is cut out, leaving only the sides, which pass through the slotted stationary plate $h$, which is formed with a tongue, $i$, projecting into the trough.

$j$ is a plate fixed to the bottom $k$ of the casing D, and passing through a transverse opening in the hinged trough.

The trough E is operated—that is, alternately raised and lowered—by a projection, $l$, on a plunger, F, which has a reciprocating motion in bearings $m\ n$, attached to the under side of the bottom $k$ of casing D, the projection $l$ working in a slot in said bottom.

$o$ is an opening in the bottom $k$, immediately under the front end of the trough.

Within the small casing $n$, which forms the forward bearing for the plunger, are secured several springs, $p\ p$, of the form shown. The office of these springs is to conduct the potato, as it is carried forward by the plunger, to the center of the knife.

This knife is composed of several cutting-edges, $q\ q$, secured within the front portion of the casing or bearing $n$, as seen clearly in fig. 3.

G represents the tube, which receives the cuttings from the knife and delivers them into the ground.

This tube has an enlarged mouth, and it is rigidly attached to the front of the casing $n$, besides being strengthened by braces $r\ r$ running to the forward cross-bar of the frame.

$s$ is the opener, secured to the lower end of the tube G.

$t$ represents a valve, which slides back and forth in a slot in the delivery-tube.

This valve regulates the passage of the cuttings, and it is connected with a pivoted lever $u$, through which it is operated, as will be presently explained.

H is a coverer, made with curved lateral wings, which serve to fill in the earth from the sides of the trench, and a rear portion, $v$, for leveling or properly shaping the surface.

This device is attached, by rods $w$, to the tube G, or to the frame, and it effectually closes the trench after the potato-cuttings have been deposited therein.

Motion is given to the plunger F, and to the regulating-valve, by means of a crank-shaft, I, one end of which passes loosely through a bearing, $x$, attached to one of the side bars A, while the other fits into a tubular clutch forming part of a pinion, $y$, which rotates freely within a bearing, $n'$, affixed to the bar A', as will be readily understood by reference to fig. 3.

The pinion $y$ gears with a large wheel, $z$, keyed to the hub of one of the driving-wheels.

$s'$ is a pitman-rod, connecting the crank-shaft I with the plunger F; and $t'$ is a tappet on said shaft, which, by contact with the end of lever $u$, operates the regulating-valve in the delivery-tube.

$u'$ is a spring, attached to the tube G, and pressing against the lever $u$.

The function of this spring is to close the valve after it is opened by the contact of the tappet $t'$.

The driving mechanism is thrown out of gear by means of a vertical shaft, $v'$, provided with a foot, which, by contact with a collar, $w'$, on the crank-shaft I, (the shaft $v'$ being operated by the driver,) moves the crank-shaft out of engagement with the clutch, in which position it is retained by an arm, $x'$, at the lower end of the shaft $v'$, entering a notch in the upper surface of the draft-bar $e'$.

$y'$ is a spiral spring, arranged upon the crank-shaft I, between the collar $w'$ and bearing $x$, which, as soon as the shaft $v'$ is turned to the right, throws the crank-shaft back into engagement with the clutch.

The shaft $v'$ is provided with a handle, which is within easy reach of the driver.

$z^1$ is the driver's seat upon the top of casing D, and $z^2$ is the foot-rest below.

It should be here stated that the object in balancing the main frame and attaching the pole to loosely-connected draft-bars within a loop is to permit the driver, while occupying his seat, to tilt the frame backward, for the purpose of facilitating the movement of the potatoes toward the rear of the hopper and into the trough.

The operation is as follows:

The machine being drawn forward, with the crank-shaft in gear with the clutch, the potatoes which are carried in the hopper will, by the motion of the machine and on account of the inclination of the bottom of the hopper, the effect of which may be increased by tilting the frame, be shaken into the trough, by the rising-and-falling motion of which they will be carried down until arrested by the plate $j$. At each upward motion of the trough one potato will pass the plate (the trough having risen above it) and strike against the tongue $i$, which stops its progress until the trough descends, when the potato passes under the tongue and falls into the box $n$ in front of the plunger, which is at this time drawn back, as shown in fig. 2. The forward motion of the plunger occurring, the potato is carried past the springs $p$, which, whether the potato be large or small, bring it in line with the center of the knife, against which it is now forced, and thereby divided into pieces of equal or nearly equal size, the cuttings falling into the delivery-tube, and thence into the trench prepared by the opener, the valve in the tube equalizing the delivery by its regular movements, which alternately close and open the passage. The coverer follows immediately after, and effectually fills in the earth.

When turning the machine, or driving over the road to and from the field, the planting mechanism is thrown out of gear, as above described.

The distance between the deposits of cuttings may be varied by changing the pinion on the crank-shaft, substituting a larger or smaller one, as may be required.

I do not wish to limit myself to the arrangement of the plunger, springs, and knife, as shown—that is to say, in a horizontal position—as they may be placed to operate vertically upon the same principle.

Having thus described my invention,

What I claim as new, and desire to secure by Letters Patent, is—

1. The combination of the centering-springs $p$, knife $q$, plunger F, and mechanism for imparting motion to the latter, all constructed, arranged, and operating substantially as herein described.

2. The hopper D, mounted on a tilting frame, and provided with the inclined bottom $f g f g$, the hinged trough E operated from the plunger, and the vertical stationary plates $h j$, all constructed, arranged, and operating substantially as and for the purposes described.

3. In potato-planters, the valve $t$, pivoted lever $u$, and spring $u'$, applied to the delivery-tube G, when operated automatically from the crank-shaft I, and having a regular intermittent motion, all constructed, arranged, and operating substantially as herein described.

In testimony that I claim the foregoing I hereunto sign my name this 22d day of October, 1870, in the presence of two subscribing witnesses.

HIRAM J. KENT.

Witnesses:
J. J. WHITE,
E. M. ANDERSON.